(12) United States Patent
Steger (10) Patent No.: US 11,277,041 B2
(45) Date of Patent: Mar. 15, 2022

(54) ENERGY DISTRIBUTION APPARATUS

(71) Applicant: ENERSYST UG, Maxhuette-Haidhof (DE)

(72) Inventor: Josef Steger, Vohenstrauss (DE)

(73) Assignee: ENERSYST UG

( * ) Notice: Subject to any disclaimer, the term of this patent is extended or adjusted under 35 U.S.C. 154(b) by 63 days.

(21) Appl. No.: 16/614,479

(22) PCT Filed: May 16, 2018

(86) PCT No.: PCT/EP2018/062777
§ 371 (c)(1),
(2) Date: Feb. 19, 2020

(87) PCT Pub. No.: WO2018/210948
PCT Pub. Date: Nov. 22, 2018

(65) Prior Publication Data
US 2020/0212730 A1    Jul. 2, 2020

(30) Foreign Application Priority Data

May 16, 2017 (DE) ...................... 10 2017 110 584.0

(51) Int. Cl.
| | |
|---|---|
| H02J 50/90 | (2016.01) |
| H02J 50/20 | (2016.01) |
| H02J 50/05 | (2016.01) |
| H02J 50/10 | (2016.01) |
| H02J 50/15 | (2016.01) |
| H02J 50/30 | (2016.01) |

(52) U.S. Cl.
CPC ............. *H02J 50/90* (2016.02); *H02J 50/05* (2016.02); *H02J 50/10* (2016.02); *H02J 50/15* (2016.02); *H02J 50/20* (2016.02); *H02J 50/30* (2016.02)

(58) Field of Classification Search
CPC .. H02J 50/90; H02J 50/05; H02J 50/10; H02J 50/15; H02J 50/20; H02J 50/30
USPC ......................................................... 307/104
See application file for complete search history.

(56) References Cited

U.S. PATENT DOCUMENTS

| | | | |
|---|---|---|---|
| 6,967,462 B1 * | 11/2005 | Landis ................. | H02J 50/90 |
| | | | 320/101 |
| 9,711,998 B2 | 7/2017 | Nakano et al. ........ | H02J 17/00 |

FOREIGN PATENT DOCUMENTS

| | | | | |
|---|---|---|---|---|
| DE | DE112014000582 | 10/2015 | ............. | H02J 17/00 |
| WO | WO2016187357 | 11/2016 | ............. | G01S 17/66 |

OTHER PUBLICATIONS

German Search Report (w/machine translation) issued in application No. 10 2017 110 5 84.0, dated Oct. 4, 2018 (13 pgs).
(Continued)

*Primary Examiner* — John W Poos
(74) *Attorney, Agent, or Firm* — Hayes Soloway P.C.

(57) ABSTRACT

Disclosed is a power supply apparatus for supplying at least one device spaced apart from the power supply with electrical power, the power supply apparatus being connectable to a power grid, the power supply apparatus including at least one position-sensing apparatus for sensing a geometric position of the at least one device. The power supply apparatus can be directed at the at least one device in such a way that power can be wirelessly transmitted by the power supply apparatus to the device and/or the device can be supplied with electrical power by the power supply device.

12 Claims, 4 Drawing Sheets

(56) References Cited

OTHER PUBLICATIONS

International Search Report and Written Opinion (w/translation) issued in application No. PCT/EP2018/062777, dated Oct. 8, 2018 (22 pgs).

* cited by examiner

ENERGY DISTRIBUTION APPARATUS

BACKGROUND OF THE INVENTION

The invention relates to an energy supply apparatus for supplying at least one device spaced apart from this energy supply with electrical energy.

The supply of technical devices and systems with electrical energy currently takes place predominantly by wired means via supply lines (cables) or with batteries or rechargeable batteries. In the case of wired supply the problem exists that, with regard to the positioning of devices, the possibility of connection to the electrical supply must be taken into consideration and depends upon it. This possibly signifies costs in the event of changing the possibility of connection in buildings, and also a restriction of convenience or mobility (placement of devices, laying of cables, space required, safety, different connectors, adapters). Thus for example mobile communication devices or mobile telephones must usually be connected to a docking station or a charging cable for charging.

In the case of battery supply it is necessary to continually purchase new batteries and to dispose the old batteries. This also signifies a restriction in the device design, since the devices must be designed so that the batteries can be replaced by the user without problems. When storage batteries are used the storage batteries must have sufficiently large dimensions so that at least a relatively long operation is possible without charging. The charging generally takes place by means of a charging socket via cable (manual contacting) by means of a charging adapter, or the storage batteries must be removed from the device for charging.

In addition systems are also known for wireless charging of devices. In this case, however, in principle the device to be charged must be positioned in a predetermined position or in a charger.

Accordingly it is an object of the present invention to increase the mobility and/or independence of location of such battery-operated devices or generally electrically operated devices, in particular also during charging and/or during operation. This object is achieved by the provision of at least one energy supply apparatus, which supplies electrical energy to technical devices or systems in particular by means of a universal/standardised and application-Independent wireless energy supply network.

SUMMARY OF THE INVENTION

According to the invention an energy supply apparatus for supplying electrical energy to at least one device spaced apart from this energy supply is provided, wherein the energy supply apparatus can be connected to an energy network and/or is itself supplied, in particular wirelessly, by an energy supply unit which is in particular spaced apart, comprising at least one position detector unit for detecting a spatial or geometric position of the at least one device and/or an orientation unit for orientation of an energy beam, which particularly preferably extends from an energy supply unit to the device to be supplied. In addition, the position detector unit can also detect a spatial or geometric position of the energy supply unit in this case it may be remarked that a spatial and geometric position should be understood equally.

In this case it would likewise be conceivable that the position of the device to be supplied is determined, and also that the position of the energy supply unit is determined. In this case it would be possible that an absolute position of these units in space is determined, but it would also be possible that a relative position of the device to be supplied relative to the energy supply unit and/or the relative position of the energy supply apparatus relative to the device to be supplied is determined.

The energy supply apparatus and/or an energy beam of the energy supply unit can be oriented with respect to the at least one device in such a way that energy, for example electrical energy, can be transmitted by the energy supply apparatus wirelessly to the device to be supplied. In this case a transmission of electrical energy should be understood to mean that ultimately electrical energy is delivered to the device to be supplied. In this case, however, the energy actually transmitted does not have to be electrical energy, but it is possible that the transmitted energy is converted into electrical energy.

In this case the position detector unit can be provided in the electrical device to be supplied and/or in the energy supply unit. In this case it would also be possible that the position is detected by the device to be supplied and is communicated and/or transmitted to the energy supply unit. This communication and/or transmission can take place in this case directly and/or by means of a higher-level communication unit to the energy supply unit and/or directly to a higher-level data unit by data communication.

It would also be conceivable that several devices can be supplied by an energy supply apparatus. When several devices are supplied, the energy supply apparatus can include several energy radiation units with fixed and/or dynamic orientation of an energy beam.

Furthermore, it is advantageous that the energy supply apparatus and/or the devices in each case have an internal energy store, in order to be able to compensate for connection terminations which may possibly occur in the energy supply between the energy network and/or higher-level energy supply apparatus and the energy supply apparatus or between the energy supply apparatus and the devices and/or with other energy supply units. These energy stores can be charged either in parallel with the operation of the device or the energy supply apparatus or in an idle mode of the device or the energy supply apparatus. For supplying several devices a dynamically controllable orientation of the energy beam and/or orientation of the energy supply apparatus is advantageous. Several energy supply units can also be provided. Thus it is possible that an energy supply apparatus in its entirety has several energy supply units which preferably are in each case suitable and intended for supplying electrical energy to electrical devices to be supplied.

Furthermore, it is advantageous if the energy supply unit has different types of energy radiation units and/or energy receivers and/or can supply different applications or devices with different energy transmission requirements. Thus several different energy transmitters could be provided, and for example light of a different wavelength can be output. Furthermore, advantageously a standardised method is provided with regard to the wireless data communication and with regard to the wireless energy transmission with the possibility of adaptation to the requirements or the possibilities of the energy receiver or of the device to be supplied.

In addition it would also be possible that the energy is transmitted between the energy supply unit and the at least one device to be supplied according to economic and/or energy-specific criteria, such as in particular but not exclusively the energy costs, a current efficiency level of the energy transmission, an energy availability, an energy demand, a state of charge of the device to be supplied and the like.

In a further preferred embodiment the device to be supplied has several energy receivers. In this way it is possible that the device to be supplied can be positioned differently and thereby in each case can still receive energy.

The device to be supplied could also have a display unit, by means of which an exact positioning of the device to be supplied is made possible. Thus, for example by means of a display of the device to be supplied, it is indicated to the user that he must still rotate this device by a specific angle in order to achieve an ideal energy transmission.

In addition, the device to be supplied can have an energy concentrator which is fixed or can be oriented and/or an energy beam-conducting material in particular on the surface thereof or acting outwards (below the surface).

In the case of the device to be supplied it is advantageous if the device has an energy receiver at several points, so that the reachability by the energy beam of the energy supply unit is guaranteed with the as highest as possible probability and as independent as possible of the situation or position of the device.

The energy receiver itself or the energy receivers themselves can be equipped so as to contain an energy concentrator which can possibly be oriented with respect to the energy transmitter.

The energy-receiving device can be equipped on the entire surface or at several points on the surface (or close to the surface) with an energy beam-conducting or concentrating material (for example light-concentrating plastic) by which the energy incident on the surface or from outside is guided to the energy receiver.

Thus plastics, and in particular but not exclusively light-catching acrylic, could be used for example for a surface of the device to be supplied. This plastic is a transparent plastic which, due to the enrichment with pigments and in particular with daylight pigments, has the characteristic of catching light like a sun awning and emitting it again in specific regions, such as for instance at the edges.

In a further advantageous embodiment the energy receiving apparatus, which may be for example a component of the device to be supplied, has an identification unit which associates the received amounts of energy to different energy supply units. This can take place for instance by means of detecting the position of the respective energy supply unit. In a further advantageous embodiment the energy receiving apparatus is suitable and intended to receive different types of energy radiation.

In a further advantageous embodiment the energy receiving apparatus is suitable and intended to deliver the received radiation energy, without conversion into electrical energy, to an energy transmitting device and/or to provide this energy in addition to the energy radiation produced in the energy transmitting device.

The energy supply network preferably has several energy supply network subscribers, energy supply units and/or energy receiving units or devices to be supplied. The co-ordination of these supply and receiving units (that is to say, in particular, devices to be supplied) takes place particularly preferably by wireless data exchange through a preferably application-independent method and particularly preferably a standardised method between the subscribers directly and/or by means of a higher-level unit (for example a data unit or control unit or regulating unit).

The energy supply unit preferably contains at least one energy transmitter and/or energy converter, which in particular converts electrical energy into energy radiation and in which the emitted energy is in particular emitted in focused form. In this case it is also conceivable that the energy supply unit emits several energy beams in several directions. Particularly preferably the respective energy beam can be deflected and/or this energy beam can be split up into several energy beams. This energy beam is preferably a light beam and/or electromagnetic radiation. Furthermore, it is also conceivable that the split energy beams can be deflected. The energy receiving unit preferably has at least one energy receiver and/or energy converter, which converts the received energy radiation into electrical energy. Thus light radiation can be converted into electrical energy again for example by such an energy receiver. The energy radiation is preferably focused and/or can be deflected.

Therefore in a further preferred embodiment the energy supply unit has an energy transmission device which is suitable and intended for generating a focused energy beam. This may for example be a laser. In this case it is conceivable that an intensity or power of this energy beam is adjustable. In this way radiation energy can be emitted and/or transmitted.

Preferably in this case the energy supply unit is configured in such a way that the focused energy beam can be deflected and/or can be output in different directions. In a preferred embodiment the output energy beam can also be split up into different energy beams or beam parts. In this case it is for instance possible that this splitting takes place as a function of the wavelength, but it would also be conceivable that a part of an energy beam such as for instance a laser beam or laser bundle is coupled out. In this case it would also be conceivable that the split energy beams can be controlled and/or deflected individually. In the case of light beams this can take place for example by the use of polarisers.

In a further advantageous embodiment the energy beam can be oriented, preferably by multiplex control (in particular by time-division multiplexing), alternately with respect to several spaced-apart devices simultaneously or quasi-simultaneously. The energy supply unit preferably has an energy transmission unit and/or energy radiation unit, which can generate several energy beams with the same or similar orientation or also several energy beams (or energy bundles) with a different orientation.

In a further advantageous embodiment the energy supply unit has an energy transmission apparatus which generates energy beams consisting of a plurality of energy beam types.

In a further preferred embodiment the energy supply unit has a controller for controlling the energy transmission apparatus and/or energy radiation unit. In this case this controller is preferably suitable and intended to control at least one parameter of the energy beam, in particular but not exclusively a type of energy beam, a dimension of the energy beam, a geometric shape of the energy beam, a focus of the energy beam and/or an energy density of the energy beam.

Furthermore, it is also possible and preferable that an energy supply unit supplies several energy receivers with energy. On the other hand, it is also conceivable that an energy receiver is supplied with energy by several energy supply units. In this case by means of a selector it is possible to select which energy supply unit should provide how much energy. Thus it would be possible for example that different energy supply units provide energy at different prices. In this case the energy receiver and/or a higher-level control unit can select the energy supply unit from which it should receive the energy and in particular also how much energy it should receive.

The supply of several energy receiving units by an energy supply unit takes place for example by several energy transmitters inside the energy supply unit and/or by splitting the energy beam from an energy transmitter into several energy beams and orientation of these energy beams with respect to the respective energy receiving units, or by time-division multiplexing of an energy transmitter or of an energy beam by means of a temporal change of the orientation of the energy beam between several energy receiving units.

It is also possible that a specific energy receiving unit is supplied with energy alternately and/or simultaneously by different energy supply units. In this case it is possible that this energy receiving unit is supplied with energy in a temporally overlapping manner, in a temporally partially overlapping manner or in different time intervals from different energy supply units.

In this case a position detector unit is understood to be a device which is suitable and intended to detect the position of a device in space and in particular relative to the energy source or energy supply unit. Furthermore it is also possible that a position of the device to be charged and/or to be supplied, such as for instance a relative position at a previous time and/or a pivoted position or the like is detected, in particular a relative position of the device with respect to an underlying surface (such as for instance a table). Thus for example it can be detected whether a mobile communication device lies with its display still upwards or downwards on a table.

Furthermore, it is advantageous that for example for operation of small devices or devices with a low or moderate energy demand no retrospective electrical installation is necessary. Furthermore, a more flexible use of electrical devices and a free positioning of electrical devices in space is possible, since the positioning of the devices is not tied to existing connections to the energy supply network and for termination purposes a clear association of the respective energy transmitter and the energy receiver is possible. Moreover, such an arrangement results in fewer sources of faults in the energy supply and greater safety, since no energy supply cable, no plug, or no plug-in adapter is necessary. In this way short-circuits, electric shocks and the danger of a cable fire can be avoided. Furthermore, in the production of such devices it is advantageous that savings can be made on raw materials for plugs or the like.

Lower energy densities, which do not represent any danger for humans and/or living creatures and/or objects, can be transmitted in particular without additional safety mechanisms. Higher energy densities are advantageously transmitted only directly (for example with the exclusion of energy transmission by reflected or deflected energy beams) to the receiving unit or the device to be supplied. In this case it is also possible that the energy transmission and/or the amount of energy to be transmitted is monitored and, if required, parameters which are characteristic for this energy transmission and/or this amount of energy, such as for instance a radiation intensity, are adapted.

In a further advantageous embodiment the apparatus has a detection means which is suitable and intended for detecting foreign bodies in a transmission path between the energy supply unit and the device to be supplied. Such foreign bodies can block and/or prevent the energy transmission. If a foreign body is registered in the transmission path the energy density is preferably reduced. Furthermore, an alert may be output to the user or to other energy supply apparatus when an undersupply of a device is identified or is foreseeable and/or when a foreign body is identified. In addition, an indication is output that an existing foreign body is to be eliminated.

If there is a risk of undersupply of a device to be supplied, a targeted energy supply of this specific device can be initiated. In the event of undersupply which impairs operation, the device can be put for example into an idle mode in which, for example by energy harvesting methods, even smaller and smallest amounts of energy are collected and stored until an amount of energy is again sufficient for determination of position, data transmission or position scanning.

In a preferred embodiment the energy supply apparatus is arranged in a mobile or stationary manner. A mobile energy supply apparatus is advantageous if the device to be supplied is not designed to be stationary and frequently a change of position is carried out or a device to be supplied at a stationary position is not reachable or is only insufficiently reachable from a specific position of the energy supply unit. Thus an energy supply can be guaranteed by a mobile energy supply apparatus at any location in space. In this case this energy supply unit can be movable in a predetermined range or can have a predetermined radius of action.

In contrast to this, a stationary energy supply apparatus is advantageous when the devices to be supplied are likewise arranged stationary in space, and during installation the respective energy supply apparatus can be oriented with respect to the respective device so that an efficient energy supply is made possible and/or the device to be supplied is easily reachable from a stationary position of the energy supply unit.

In a preferred embodiment the position detector unit is selected from a group of position detecting units which comprises cameras, beacon technology, a GPS sensor, GSM, WLAN, Bluetooth, an acceleration sensor, inclination sensor, a compass, gyrometer, altimeter or other known position detecting units. In this way a one-dimensional and/or two-dimensional and/or three-dimensional position detection (in particular of the energy supply apparatus and/or in particular the device to be charged or to be supplied) can be carried out. In addition the surroundings or environment of the device to be supplied can also be identified or detected by means of a detection device such as in particular, but not exclusively, a camera. Thus for instance an energy network subscriber can scan the environment of the device to be supplied in one, two, three dimensions or multi-dimensionally, wherein this scanning can take place for instance at different times or at different time intervals.

Furthermore, it is preferable that the position of the spaced-apart device can be detected autonomously. This means that the energy supply apparatus can autonomously search for devices in space by means of the aforementioned position detector unit and can also detect the devices and can be oriented accordingly. This offers inter alia the advantage that when the position of the devices is changed the energy supply apparatus does not have to be reoriented by hand, but the energy supply apparatus autonomously detects the device again and orients itself accordingly.

Furthermore, it would certainly be conceivable that the device to be supplied detects its position continuously or also at intervals and transmits or communicates it to the energy supply apparatus and/or a higher-level unit (for example a data unit, control unit and regulating unit) by means of a data communication.

In a further advantageous embodiment the position detector unit is suitable and intended to determine the absolute device position. However, it would also be conceivable that the relative device position with respect to another device and/or to a reference point is determined. Furthermore, it would also be possible that the position detector unit has a time recorder unit. In this way it would be possible to determine a relative device position with respect to a preceding device position. In addition the position detector unit may also be suitable and intended for determining a position of the device (rotational position, pivoted position and the like) or an orientation of the device.

In addition it would also be conceivable that the positioning of the receiving apparatus takes place by scanning of the surroundings. Thus for instance the scanning of energy receivers could take place by means of a focused beam and deflection of the beam in a region provided therefor. In this case the scanning can preferably take place 1-dimensionally and/or 2-dimensionally and/or 3-dimensionally.

In a preferred embodiment it would also be conceivable that the energy receiving apparatus measures the energy density of the scanning signal over time continuously and/or at intervals and transmits the measured values over time to the energy transmitting apparatus and/or to a higher-level unit (for example a data unit, control unit or regulating unit). From the received measured values over time and the beam deflection over time the system can preferably determine the position of the energy receiver. Different (also several) types of radiation can also be used for scanning.

In addition, as mentioned above, the position detection can take place by means of one or more cameras. The camera or cameras can detect visible light and/or invisible light. The evaluation of the picture signal can take place by means of image recognition. For better identification of the receiving apparatus the energy receiving apparatus can transmit a signal at the energy receiving position which can be easily recognised or evaluated by the camera.

Furthermore, the position detection of a device to be supplied and/or an energy supply apparatus can also take place by means of location by for example several energy supply apparatus.

Furthermore, passive supply units can be (alternatively or additionally) provided, which only reorient the orientation of the energy radiation received from a supply unit with respect to one or more energy receivers. In addition, a combination of active and passive supply units is possible and preferable.

If needed, taking account of predetermined parameters, the device preferably requests a power and/or amount of energy from the energy supply apparatus directly and/or by means of a higher-level unit (for example a data/control/regulating unit) or the energy supply apparatus supplies the device automatically taking account of the predetermined parameters of the device or the energy supply apparatus. Parameters are technical and/or economic and/or other parameters.

It would also be conceivable that all subscribers of the energy network (energy supply apparatus or devices) can exchange energy with one another.

In a further preferred embodiment the energy supply unit has an identification unit for identifying the device to be charged and/or to be supplied. Thus for example a mobile communication device to be charged and/or to be supplied can be identified and for example checked as to whether this specific device is intended for charging. In this way it is possible that for instance a user can select which devices are to be charged and which are not. It is also possible to ascertain what type of energy and/or what amount of energy, delivered in particular from a specific supply unit, is assigned to which device. This identification unit can for instance evaluate a signal transmitted by the device to be charged, such as for instance a Bluetooth signal or a signal transmitted by means of WLAN.

In a further preferred embodiment the energy supply unit has a transmitting unit for transmitting energy. In this case this energy can be transmitted in different ways and in particular can be transmitted directionally. Furthermore it is preferable that the energy can be transmitted by means of directional energy radiation and/or energy bundle. The energy radiation is advantageously selected from a group of energy sources, comprising light, lasers, microwaves, radio radiation, inductive radiation, masers, ultrasound, X-ray radiation, radar radiation, or capacitive radiation. A wireless energy transmission is currently generally provided (for example inductively) by undirected (not concentrated/not focused) radiation and currently the placement of the devices is generally only possible within a narrow range (charging tray, charging position etc.).

Furthermore the current solutions are very application-specific. Due to the solution proposed here charging and/or operation and/or supply of electrical devices is possible over a greater distance automatically or autonomously. The respective device to be charged and/or to be supplied can have a receiving unit for receiving the emitted energy bundle. Furthermore, the device to be charged and/or to be supplied can have an energy converter unit which converts the transmitted form of energy into electrical energy. In the case of light this may be both light in the visible wavelength range and also light in the non-visible wavelength range such as for instance UV or IR light. In addition the use of laser light is also conceivable.

The supply unit transmits the energy radiation preferably in a focused form and directs the energy beam to a device to be supplied or to several devices to be supplied. Thus the radiation emanating from the supply unit preferably has a preferred direction in space. It is possible that the type of radiation energy and/or the form of the energy bundle (for instance a light bundle) are predetermined. Furthermore, it is possible that the energy supply unit can transmit one or more types of radiation energy. Thus it is possible for example that the energy supply unit can emit light of different wavelengths. It would also be possible that the energy supply unit emits different types of radiation, such as for instance light, ultrasound, microwaves and the like.

In addition, the energy density or radiation intensity to be transmitted and/or the amount of energy can also be predetermined. In this case it is in particular possible that for instance the energy density and/or the amount of energy are predetermined by the device to be supplied. Thus for example it may be required that a device to be supplied should only be charged up to a specified state of charge, for instance 50%, and as soon as this has been reached the energy transmission is terminated. It would also be conceivable that the amount of energy to be transmitted is determined from the outset by the device to be supplied. In this case it would be conceivable that these parameters are predetermined by the device to be supplied. Additionally or alternatively it is conceivable that these parameters are predetermined by the energy supply unit and/or by a higher-level unit (for example a data/control/regulating unit).

The orientation of the directional energy radiation is automatically adapted to the position of the device and tracked. In the case of several energy supply apparatus the power and/or amounts of energy to be transmitted by the energy supply apparatus are controlled according to energy demand and/or efficiency and/or economic efficiency and/or arbitrarily (chance) and/or according to other criteria.

The at least one device to be supplied and/or to be charged preferably has a communicative connection to the energy supply apparatus and/or can produce such a connection.

By means of the communicative connection data can preferably be transmitted to the energy supply apparatus, these data being characteristic for an energy supply to the device, such as in particular but not exclusively parameters of the energy receiver, a position of the device, a degree of effectiveness, a maximum power, a required amount of energy, an energy consumption or a state of charge of the device. In addition a data communication and/or a data exchange with other devices and/or a higher-level unit (for example a data/control and regulating unit) is also conceivable, such as for example to further supply units, central data units, data stores, internet data stores (clouds) or the like.

A communicative connection between the energy supply apparatus and several devices, if an energy supply apparatus is to supply several devices, would also be conceivable. By means of this communicative connection an identification of the device and/or the energy supply unit is preferably also possible. This communicative connection is preferably also a wireless connection. Preferably the energy supply unit adjusts to the device to be supplied according to the data and parameters, for example with regard to an energy density to be transmitted, a time period of the energy transmission and the like.

Furthermore, it is also possible that the device with energy transmitting apparatus (for instance the energy supply unit) and/or energy receiving apparatus (for instance the device to be supplied) wirelessly transmits the data of the energy transmitting apparatus and/or the energy receiving apparatus which are relevant for the energy transmission to another device or several other devices (with energy transmitting apparatus and/or energy receiving apparatus) and/or to a higher-level unit (e.g. data/control and regulating unit) and/or a local data unit and/or a central data unit and/or by internet connection to a central computer and/or an internet data store/cloud store.

In addition it is also preferable that the data relevant for energy transmission from one or more devices (with energy transmitting apparatus and/or energy receiving apparatus) are stored in another device or several of other devices (with energy transmitting apparatus and/or energy receiving device) and/or in a local data and/or control unit and/or in a central data and/or control unit and/or in a higher-level central computer and/or in an internet data and/or control unit and/or are evaluated and/or analysed and/or corresponding actions for energy transmission are instigated (according to the parameters, the data, the defined algorithms).

In addition it is also preferable that registration data of the energy supply apparatus and/or of the device to be supplied with an energy transmitting apparatus and/or energy receiving apparatus, are stored, for example device ID, access data and access authorisations.

Furthermore, it would also be preferable that data for personalisation of the energy supply apparatus and/or of the device to be supplied with an energy transmitting apparatus and/or energy receiving apparatus, are stored, for example owner, user, economic beneficiary, bill recipient, bill issuer. Furthermore, it would also be preferable that the specific parameters for the energy transmission and data of the energy supply apparatus and/or of the device to be supplied with an energy transmitting apparatus and/or energy receiving apparatus, are stored. In this case these data are preferably selected from a group of data, including data relating to a type of radiation, data relating to minimum or maximum energy density, data relating to a form of the energy bundle, data relating to energy beam parameters, combinations and the like.

Preferably energy-related economic data of the energy supply apparatus and/or of the device to be supplied with an energy transmitting apparatus and/or energy receiving apparatus, are stored. These data may be for instance data relating to a price of the transmitted energy, data relating to a maximum accepted price of the received energy and the like. In addition, operating data of the energy supply apparatus and/or of the device to be supplied can be recorded, transmitted and/or stored, such as for instance current consumption, a state of charge and/or a position. The same also applies to billing data of the device such as for instance a transmitted or received amount of energy.

The apparatus preferably also has a controller which controls the energy transmission. In this case it is possible that the energy beam of the energy transmitting apparatus is controlled on the basis of the parameters of the energy receiving apparatus which are specific for the energy transmission. Furthermore, it is also possible and preferable that the energy transmitting apparatus adjusts to the possibilities and requirements of the energy receiving apparatus as far as possible and/or necessary and/or predetermined.

As stated above, it is preferable that the energy transmission takes place according to economic and/or energy-specific criteria such as energy costs, current efficiency of the energy transmission, energy availability, energy demand, state of charge or predictions of these criteria.

In addition it is also conceivable and preferable that the energy transmission takes place autonomously in the context of the predetermined parameters and/or the current data and the predetermined algorithms.

As mentioned above, the apparatus preferably also has an energy measuring unit. In this case the amount of electrical energy used for energy transmission and/or the transmitted amount of energy radiation is preferably measured. In addition, the received energy radiation and/or the provided electrical energy is preferably measured by means of an energy measuring unit. In this case the values determined by the measuring unit are preferably also suitable for billing purposes. In a preferred embodiment the device with the energy transmitting apparatus and/or the energy receiving apparatus is personalised with regard to owner and/or user and/or the economic beneficiary and/or the person authorised for billing.

In a further preferred embodiment a measuring device for measuring the energy required for the energy transmission and/or the output energy and/or the incoming energy in the device to be supplied and, if required, also the energy consumption is associated with the energy supply apparatus. Preferably in this way for instance the amount of energy required and actually transmitted can be determined. In this case such a measuring device be for example integrated in the energy supply unit. The device to be supplied can also measure the energy incoming there and preferably can also communicate it to the energy supply unit and/or a higher-level control unit.

In this case it is advantageous that for each energy supply apparatus and/or for each device to be charged the individual energy consumption and/or the received amount of energy can be measured and accordingly also individual billing of the consumption for each energy supply apparatus owner and/or each owner of a device to be charged is possible. Advantageously a consumer-related billing at the component level or device level and optimisation of energy costs by time control and supply for example in the event of energy surplus and cheap electricity is possible.

Furthermore, data specific for the energy supply and parameters of the energy network subscribers are transmitted and stored in a data store. The data transfer between the energy network subscribers preferably takes place wirelessly directly with other energy network subscribers and/or by means of a local central unit and/or by means of an internet gateway and a central web server or a central data store and/or cloud store.

For storage or for data transmission, data can be provided which are selected from a group of data which includes registration data of the energy network subscribers such as for example unique ID (device ID, device owner, device user), owner, user, economic beneficiary, billing data (such as bill recipient and bill issuer) and access authorisations.

Parameters specific for the energy transmission can be selected from a group of parameters which includes the type of possible energy radiation, energy beam parameters, energy density as well as required amount of energy.

In addition, economic parameters can preferably also be selected, which in particular are selected from a group of parameters which includes the price of the radiation energy of the energy supply unit as well as the maximum accepted price of the energy received by the receiving unit or the provided energy, wherein these parameter can also be chosen inter alia as a function of the current consumption or the current state of charge.

In addition operating data can also be selected, such as in particular but not exclusively a recent consumption and current position. Lastly, billing data such as the amount of energy transmitted or received can also be taken into consideration.

In this case it is possible that a user predetermines and/or selects these data. The selection of these parameters can also be proposed to the user for example through a menu.

The energy supply unit preferably adjusts as far as possible to the possibilities and requirements of the device to be supplied. The parameters for energy transmission are preferably transmitted directly to the reachable energy network subscribers and/or to a local data unit and/or to a higher-level central database on the internet. In this case it is also possible that in the selection of specific parameters a prioritisation is carried out or a selection is made as to which parameters are to be observed with higher priority. Furthermore, it is also conceivable that parameters to be observed in any case which are determined by a user are predetermined and the energy supply unit or a higher-level control unit adapts or selects further parameters.

The control of the energy transmission of the energy supply apparatus to the device to be supplied or to the devices to be supplied preferably takes place on the basis of the data (for example configuration data, master data, parameters, operating data or the like) autonomously and/or by means of a local control unit and/or by means of a higher-level control unit (app) on the Internet and is preferably geared to the requirements of the device to be supplied.

The stipulation of the amount of energy to be transmitted is preferably oriented to parameters of the individual energy network subscribers and particularly preferably includes technical parameters and/or economic parameters and/or other parameters. Thus a comparison can be made between several energy supply units or transmitters and a price can be negotiated.

A comparison unit is preferably provided which carries out a comparison of different energy supply units. In this case this comparison can be carried out preferably on the basis of the above-mentioned parameters. Thus for instance the comparison unit can compare the economic efficiency of the individual energy supply units, and can preferably also select a specific energy supply unit.

The subscribers of the energy supply network, the supply units and the devices to be supplied or to be charged, are preferably personalised with regard to the owner and/or user and/or with regard to the person authorised for billing. At least one subscriber, preferably several subscribers and particularly preferably every subscriber of the energy supply network preferably contains a discrete measurement point suitable and/or permitted for billing purposes. The billing of the transferred amounts of energy takes place particularly preferably on the basis of the measurement data to the corresponding owner or user or other person authorised for billing associated with each subscriber. The owner or user of the respective supply unit is the energy seller and the owner or user of the respective device to be supplied or to be charged is the energy buyer.

The apparatus preferably has an in particular wireless data interface and/or wireless interface to a data network. A central data acquisition unit and/or a data analysis unit is also preferably provided, which in particular is suitable and intended for detecting and/or analysing relevant data for the energy transmission.

The energy supply apparatus or also individual energy supply units can also be supplied with energy and in particular can also be supplied with energy wirelessly.

Furthermore, according to the invention a method for wireless supply of at least one device by means of an energy supply is provided which comprises the following steps:
  connecting the energy supply apparatus to a higher-level energy network or a higher-level energy supply apparatus
  detecting the device to be supplied by the energy supply apparatus by means of a position detector unit
  preferably identifying the device to be supplied
  orienting the energy supply apparatus or the energy beam with respect to the device to be supplied
  wireless transmission of energy to the device to be supplied.

In a preferred method, data and parameters relevant for the energy transmission are detected, such as an energy output by an energy supply unit, an energy received or picked up by the device to be supplied, an efficiency level and the like. In addition an analysis of these data or parameters preferably also takes place. The energy is preferably transmitted taking these data or parameters into consideration.

Furthermore, the invention is directed to a device to be supplied with energy, to which energy can be transmitted from an energy supply apparatus which is spaced apart, as shown above. The local, decentralised, central and internet-based or cloud-based data acquisition/data memory/data analysis/control and regulating units as well as all thereto related methods, operations and algorithms, the data communication and all components of the system setup are also claimed by this application. In this case a device which is spaced apart and is to be supplied with energy may itself also include an energy supply apparatus.

Advantageously energy can be transmitted wirelessly to a device to be supplied (or a component to be supplied) by an energy supply apparatus. The device to be supplied (or the component to be supplied) preferably contains one or more energy receiving units which collect(s) the energy radiation on the surface or close to the surface of the device and directs it to the receiving unit and/or to several receiving units. The device to be supplied with energy (or the component to be supplied) can preferably receive energy from one and/or several energy supply apparatus with in each case the same type of radiation and/or in each case different types of radiation. In this case information in the energy beam can preferably be evaluated and on the basis of this information it is possible to ascertain the energy transmission apparatus which transmits the energy. Thus several energy supply apparatuses can transmit to a device and the respective transmitted amount of energy can be detected and assigned by means of measurement techniques. It is preferably also possible that information in the energy beam can be evaluated and on the basis of the information in the energy beam a data exchange with the device or the device application is enabled.

Furthermore, the invention covers the formation of a wireless energy network. This also includes the formation of a wireless energy network consisting of several supply units and several devices to be supplied, the formation of a hierarchical unidirectional wireless energy network, a hierarchical bidirectional energy network, a partially meshed wireless energy network and a fully meshed energy network, likewise all mixed forms resulting therefrom. The same applies to the formation of other possible network structures, as well as the inclusion of wireless energy repeaters (active or passive, unidirectional or bidirectional) for transmitting the energy radiation and the inclusion of wireless energy gateways (active or passive, unidirectional or bidirectional) for transmitting the energy to devices and/or energy networks with a different type of wireless energy transmission or with wired energy transmission.

In an energy network with several nodes and/or energy network subscribers with uniform data handling/control/regulation it is advantageous to form, from several energy supply apparatuses and several devices to be supplied, a wireless energy network with local and/or decentralised and/or central and/or internet-based or cloud-based master data management, configuration data management, parameter management, data acquisition, data storage, data analysis, control and regulation of the energy transmission.

A wireless energy network can also be structured hierarchically with unidirectional energy transmission. In this case a device or several devices to be supplied themselves contain an energy transmission apparatus for supplying at least one further device. In a hierarchically structured bidirectional energy network the supplied device can also transmit energy back to the energy supply unit which supplies this device.

For improvement of the security of supply of the devices supplied wirelessly with energy, a meshed (partially meshed or fully meshed) wireless energy network or energy partial network can also be formed.

In a partially meshed energy network or energy partial network one or more energy network subscribers can in each case transmit unidirectional and/or bidirectional wireless energy to one or more other energy network subscribers.

In a fully meshed energy network or energy partial network each energy network subscriber can transmit energy wirelessly to each other energy network subscriber.

For realising an energy network additional wireless energy network components with specific functionality can be advantageous. This may involve for example wireless energy network devices, wireless energy repeaters or wireless energy gateways. In this case the aforementioned components can be passive or active, unidirectional or bidirectional. The aforementioned components are explained briefly below.

In this case a wireless energy network device (unidirectional or bidirectional) is a device with at least one energy receiving unit and at least one energy transmitting unit, as well as one or more application-specific device functions (for example sensor function, actuator function, data storage function, etc.).

The wireless energy network device (unidirectional) is supplied with energy wirelessly by another energy supply unit or another wireless energy network subscriber. The received energy can be consumed and/or stored by the device. Furthermore, the device can transmit the received and/or stored energy wirelessly to a further energy network subscriber.

The wireless energy network device (bidirectional) is supplied with energy wirelessly by another energy supply unit or another wireless energy network subscriber. The received energy is consumed and/or stored by the device. Furthermore, the device can transmit the received and/or stored energy wirelessly to a further energy network subscriber. However, it can also receive energy wirelessly again from the supplied device and can transmit energy back to the energy supply unit.

A passive wireless energy network device (unidirectional or bidirectional) contains no store for electrical energy. Thus for this reason it can only consume, or relay to another subscriber, as much energy as is currently received by the energy receiving unit.

An active wireless energy network device (unidirectional or bidirectional) contains a store for electrical energy. Thus in the event of temporarily insufficient received energy or power, or in the event of higher energy consumption and/or higher inherent power demand or higher energy demand and/or power demand, for supplying a further device in addition to the received energy or power, the device can also use the stored energy from the store to cover the required energy demand or power demand.

A wireless energy repeater merely orients the received energy beam again with respect to one or more devices to be supplied or adapts the energy beam to the requirements of the respective device to be supplied.

In addition a wireless energy repeater (bidirectional) can also, if required, request energy from a device to be supplied and can transmit it back again to the supply energy supply unit which supplies this wireless energy repeater. In this case the energy beam received from the device to be supplied is merely reoriented by the repeater with respect to the energy supply unit to be supplied.

A wireless energy repeater (passive) merely reorients the received energy beam with respect to one or more receivers to be supplied or adapts the energy beam to the requirements of the respective receiver to be supplied. A preceding conversion of the received energy into electrical energy does not take place.

A wireless energy repeater (active) has the functionality of the wireless energy repeater passively, but a part of the received energy or the entire received energy can be converted into electrical energy and stored temporarily. Furthermore, it is possible additionally by means of an energy transmission device to transmit the stored energy if required in order to achieve higher power levels or amounts of energy or in the event of insufficient received energy or power in addition to the energy beam relayed without conversion.

When so-called wireless energy gateways are used, energy supply units and/or devices and/or energy stores and/or energy consumers and/or energy transmission systems and/or energy networks with a different type of radiation and/or different type of energy transmission (for example wireless energy transmission with undirected, unfocused or less oriented, less focused radiation or wired energy transmission), can also be incorporated into the wireless energy network with directional radiation.

A wireless energy gateway serves as energy interface between two different energy transmission systems or energy transmission types (such as for example energy transmission by directional/focused energy beams, energy transmission by undirected/unfocused or less oriented/less focused radiation, wired energy transmission), wherein the energy received or picked up by an energy transmission system is initially converted into electrical energy and then the electrical energy is converted into the form of energy of the other energy transmission system. In this case the energy transmission between the two different energy transmission types can take place unidirectionally or bidirectionally.

A wireless energy gateway in a passive configuration contains no energy store and can only transmit as much energy into the other type of energy transmission as is received by the wireless energy gateway.

A wireless energy gateway in an active configuration can temporarily store a part of the received energy or the entire received energy. If required or in the event of less received energy or in the event of interruption of the reception of the energy, in order to achieve higher power levels or higher amounts of energy, the temporarily stored energy can be additionally transmitted into the other energy transmission system.

In order that, in particular in the event of simultaneous supply by several energy transmitters, the energy receiver can ascertain how much energy has been received from which transmitter, information can also be transmitted simultaneously with the energy transmission and/or the transmitter and receiver are specifically set to different types of radiation and/or different radiation parameters.

An energy transmission system can simultaneously include several wireless energy transmission types (for example directional energy radiation types, undirected types of radiation such as inductive energy transmission, magnetic resonance methods inter alia) and/or a wired energy transmission (for example copper cable) in an energy supply unit and/or a device to be supplied. The use of the different transmission type can take place depending upon technical possibility and/or on the basis of preset and/or dynamic (technical and/or economic and/or other) parameters of the subscriber. In this case the transmissible power can vary depending upon the method of transmission. Thus for example the following values can be produced (which in particular, but not exclusively, dependent upon the transmission type), wired (max. 100 W), inductive at a short distance up to 5 cm (max. 15 W), at a short distance up to 20 cm by means of magnetic resonance methods max. 5 W, at a distance of up to 2 m and sight line with light (max. 0.5 W), at a distance up to 5 m and sight line with laser (max. 0.1 W), at a short distance up to 5 m without sight line with microwaves (max. 0.05 W).

For safety reasons it is advantageous, particularly in the event of high radiation density, that the energy transmission unit also includes the recognition of extraneous objects and/or living objects by known methods.

The storage of the data necessary for the energy exchange between energy supply units and devices (master data, configuration data, operating data etc.) and the data analysis and/or the control and/or regulation of the energy exchange between the energy supply units and the devices can preferably take place locally in the energy supply unit and/or the device to be supplied and/or locally in a decentralised data, control and regulating unit and/or in a central data, control and regulating unit and/or in an internet-based/cloud-based data, control and regulating unit. The storage of the data and/or the control and regulation of the energy exchange can take place depending upon availability and/or depending upon set fixed and/or dynamic parameters locally, decentralised, centrally or internet-based in the cloud.

Devices (electronic devices and/or electronic components) of energy transmission systems and/or energy networks with a different type of radiation and/or different type of energy transmission (for example wireless energy transmission with undirected, unfocused or less oriented, less focused radiation or wired energy transmission), can also be incorporated by means of energy gateways into the energy billing system for the wireless energy network with directional radiation.

In the event of a risk of undersupply, the device to be supplied wirelessly can preferably emit an emergency signal autonomously and can request preferred energy supply from an energy supply unit and/or from the higher-level control and regulating system and/or also can inform a device user and/or another person and/or another system.

If the device to be supplied wirelessly fails completely because of a lack of energy the device to be supplied wirelessly is preferably deactivated (for example, idle mode) and exclusively by means of energy harvesting methods initially an amount of energy which is necessary for is stored temporarily in an energy store which is necessary for a determination of position and for data-technical transmission of at least the position of the device. Then the device is put into the active mode, the position is determined and the position is transmitted by means of the configured data interface and/or another data communication interface and/or an available network to at least one energy supply unit and/or to a higher-level data/control and regulating system.

The energy supply unit preferably has an energy transmission unit and/or an orienting unit which is capable of orienting the energy beam by means of time-division multiplexing dynamically alternating on several devices (3) to be supplied of energy receiving units (3) simultaneously or quasi-simultaneously and/or the energy transmission unit (25) is capable of splitting up the generated energy beam into several energy beams and orienting the respective split-up energy beams relative to a device (3) to be supplied and/or to several devices (3) to be supplied and/or the energy transmission unit (25) has several individual energy transmission units (25) or radiation units which emit the same and/or different types of radiation and/or the same and/or different orientations of the radiation, and as a result energy can be transmitted simultaneously and/or quasi-simultaneously to several devices (3) to be supplied or energy receiving units (3), wherein, with the respective energy beam, energy and/or simultaneously information for identification of an energy supply apparatus (2) or the energy transmission unit (25) and/or simultaneously information for data exchange with the device (3) to be supplied or the device application can be transmitted.

More preferably the energy transmission unit can adapt the energy beam with regard to the energy density and/or the beam geometry and/or the type of radiation and/or other parameters relevant for the energy transmission to the requirements of the energy receiver and/or the specifications of a local and/or decentralised and/or central and/or internet-based or cloud-based control or regulation unit. In this case the energy density could be set for example by a control/regulation of the transmission power. The beam geometry is understood for example to be the cross-section, the dimension, the surface, the shape of the energy beam. In this case this can be achieved for example by several beam units aligned in the same direction, a laser matrix or by covering or possibly by reflection of specific regions. The type of radiation could be adapted for example so that several radiation units are used with a different type of radiation.

Furthermore, the invention is directed to a circuit arrangement for formation of an energy network with wireless energy transmission, consisting of several energy supply units and several devices to be supplied. An energy network subscriber is capable of transmitting energy wirelessly to at least one other energy network subscriber and/or an energy network subscriber can be supplied with energy wirelessly by at least one energy network subscriber and/or the location of one or more energy network subscriber takes place autonomously and/or the control and regulation of the wireless energy transmission between the network subscribers takes place autonomously in local and/or decentralised and/or central and/or internet-based or cloud-based data units and/or computer units on the basis of the master data and/or the operation data and/or on the basis of the data analysis and/or on the basis of fixed and/or dynamic algorithms and/or other fixed and/or dynamic technical and/or economic parameters, wherein the network also includes energy network subscribers with specific energy transmission function, such as active or passive unidirectional or bidirectional wireless energy repeaters for relaying energy to another energy network subscriber, active or passive unidirectional or bidirectional wireless energy gateway for integration of devices and/or energy networks with another type of wireless energy transmission and/or for integration of devices and/or energy networks with wired energy transmission.

Furthermore, the invention is directed to a circuit arrangement for wireless transmission of energy, wherein an energy transmission apparatus and/or a device to be supplied wirelessly includes an energy-measuring system suitable for billing purposes for measuring the energy used and/or transmitted in the energy transmission unit or the energy received by the device to be supplied and/or energy actually made available and the amounts of energy measured by means of measurement techniques can be uniquely assigned to the respective energy transmission apparatus and/or the respective device to be supplied or the amount of energy used and/or transmitted and/or received and/or made available can be transmitted to a higher-level system for data acquisition and/or data analysis by means of data communication which can be personalised by means of the owner or user or economic beneficiary of the energy supply unit and/or of the device to be supplied which are stored in the master data and wherein the data are made available for billing purposes.

Further advantages and embodiments are disclosed by the appended drawings. Technical features set out therein are also claimed in isolation from their combination of features only set out by way of example. Technically features with the same or similar action are designated by the same reference. For reasons of clarity the designation of repeatedly illustrated technical features is dispensed with in some instances.

DETAILED DESCRIPTION OF THE INVENTION

Figure 1:
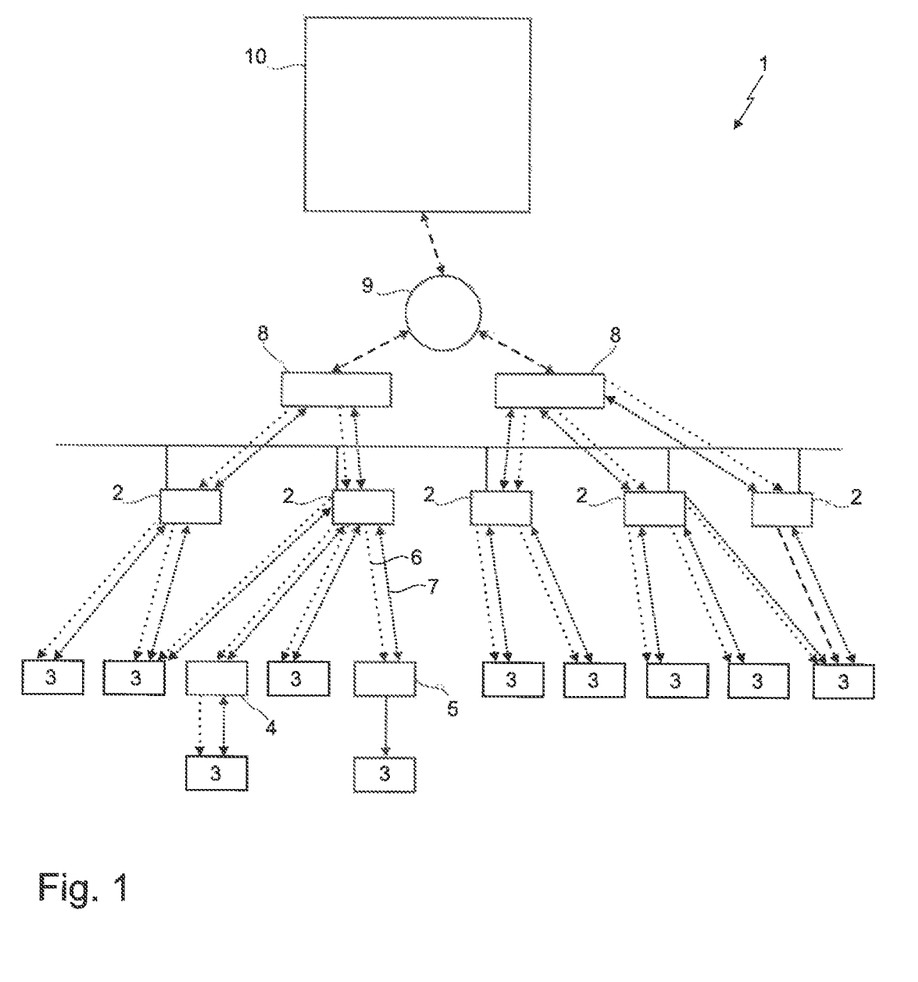
FIG. 1 shows a schematic view of an energy supply system.

FIG. 1 shows an overall structure of an energy supply system 1. In this case this energy supply system 1 comprises several energy supply apparatus 2, which can transmit energy radiation 6 to devices 3 or consuming devices. Alternatively, the energy radiation 6 can be relayed first of all to an energy relaying line 4 or an energy converter 5 which in each case can in turn be connected wirelessly or also by wired means to a device 3. The devices 3, the energy relaying line 4 and also the energy converter 5 have a reciprocal communicative connection 7 with the respective associated energy supply apparatus 2. In this case the energy supply apparatus 2 are connected by wired means or wirelessly to a higher-level energy network. The energy converter illustrated here can be configured actively or passively. The passive energy converter 5 reorients the received energy radiation without converting the received radiation energy.

The active energy converter receives and stores the received energy and if required it generates directional radiation energy in order to supply a device or a further energy converter.

Furthermore, the energy supply apparatus 2 have a communicative connection to a web gateway 8 by means of which they have access to the internet 9. By means of this connection the energy supply apparatus 2 gain access to a central unit 10 (for example central computer, central database, web server, cloud, cloud computing). A database as well as applications are stored in this central unit 10. Information about user data or registration data, configuration data/parameters, operating data/control data as well as billing data are stored in the database. Thus the registration of all energy nodes, the configuration/parameterisation, the operating data capture and the system control as well as the billing are carried out by means of this central unit.

Figure 2:
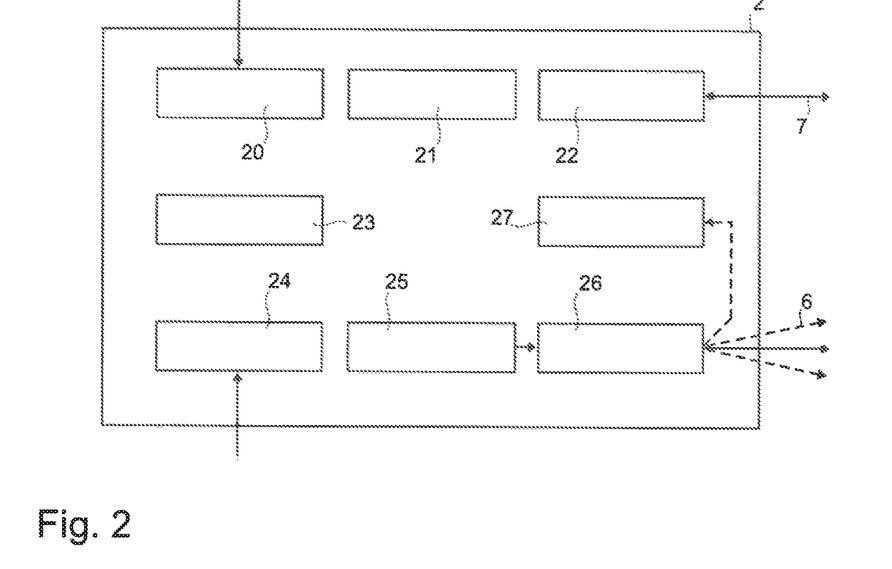
FIG. 2 shows a schematic view of an energy supply apparatus.

FIG. 2 shows a schematic view of an energy supply apparatus 2. In this case this energy supply apparatus 2 comprises an energy converter 20, a control unit 21, a communication device 22 for wireless communication, an energy store 23, a position detector unit 24, a radiation energy generator unit or an energy beam transmitting unit 25, which generates the energy radiation 6, an orienting device 26 for the energy radiation 6 and a measuring unit 27 which measures the transmitted energy radiation.

Figure 3:
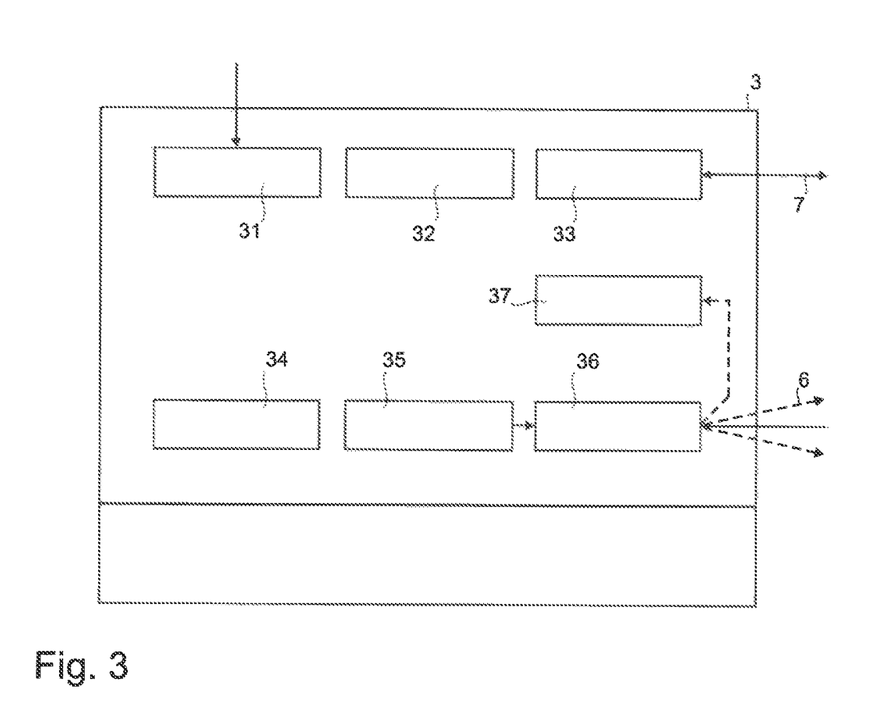
FIG. 3 shows a schematic view of a device to be supplied.

FIG. 3 shows a schematic view of a device 3 or a consuming device. The consuming device also comprises a position detector unit 31, a control unit 32, a communication device 33 for wireless communication, an energy store 34 as well as an energy beam collecting unit 36 (for example a concentrator). The energy beam collecting unit 36 directs the received radiation energy to the energy beam receiving unit 35, which converts the received energy radiation 6. Furthermore, a measuring unit 37 is provided in order to measure the received energy radiation 6.

Figure 4:
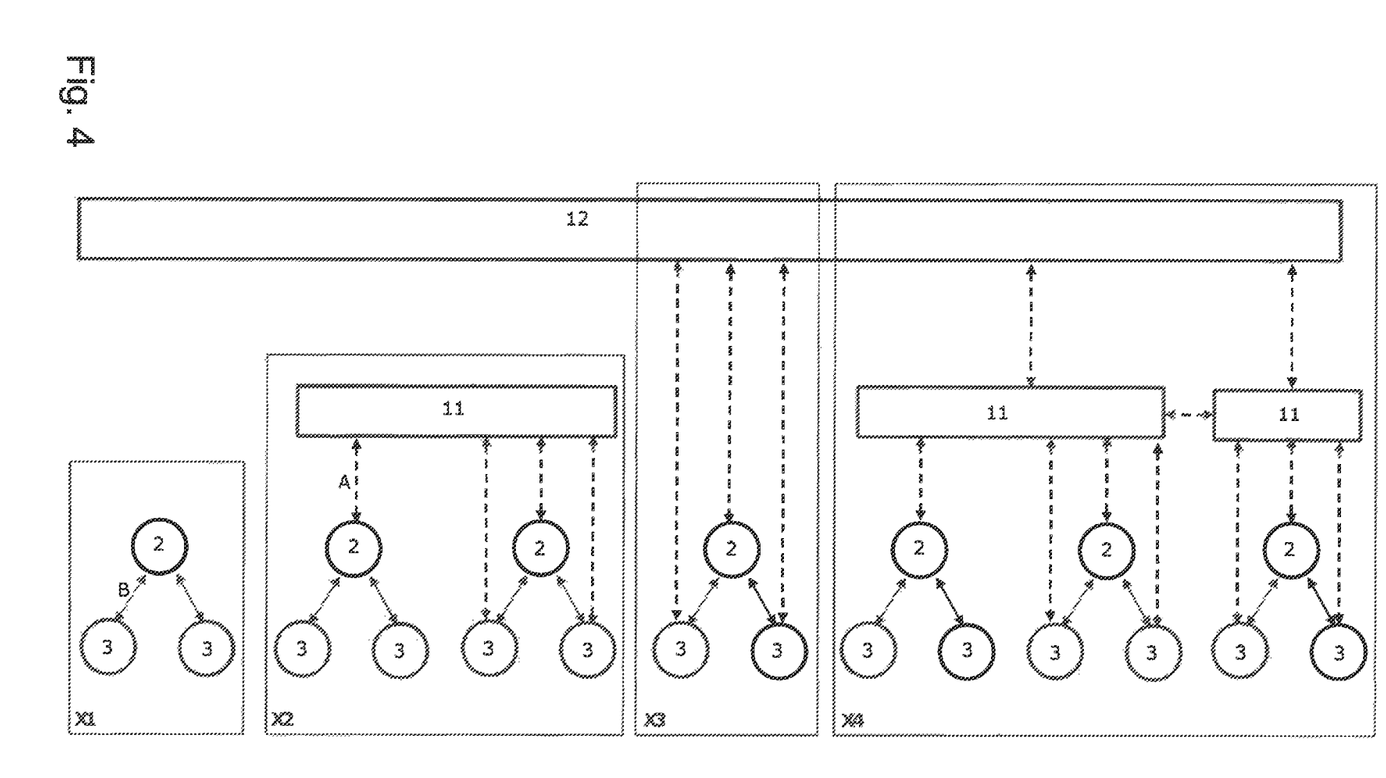
FIG. 4 shows a schematic layout of a data communication of a wireless energy network.

FIG. 4 shows a schematic layout of a data communication of a wireless energy network by way of example. The reference X1 shows a first variant in which the data acquisition, control and regulation of the energy transmission takes place only by means of a data communication between the energy supply apparatus 2 and the device 3 to be supplied. The data communication between the energy supply unit 2 and the device 3 to be supplied are illustrated by means of the bold arrow B.

The region X2 shows a second variant. This shows data acquisition, control and regulation of the energy transmission by means of data communication between the energy supply unit 2 and the device 3 to be supplied and by means of data communication with local data/control and regulating unit 11. In this case the dashed arrow A symbolises data communication with a higher-level data/control and regulating unit 11 for the energy transmission. In this case this data communication can take place only between the energy supply unit 2 and the data/control and regulating unit 11 or also additionally with the device 3 to be supplied.

The region X3 shows a third variant. Here, as in the regions X1 and X2, the communication between the energy supply apparatus 2 and the device 3 to be supplied is shown. In this case, however, a communication takes place between a central or internet-based or cloud-based data/control and regulating unit 12 and the energy supply apparatus 2 and the device 3 to be supplied.

The region X4 shows a fourth variant. In this case again the communication between the energy supply apparatus 2 and the device 3 to be supplied is shown. Furthermore, again it can also be seen that a data communication with a higher-level data/control and regulating unit both between a local data/control and regulating unit 11 and an energy supply apparatus 2 and also between a local data/control and regulating unit 11 and a device 3 to be supplied can take place. Furthermore, it is shown here that several local data/control and regulating unit 11 can also communicate with one another. Furthermore, it is shown here that a communication takes place between a local data/control and regulating unit 11 and a central or internet-based or cloud-based data/control and regulating unit 12.

As shown in the variants X1, X2, X3 and X4, in each case more than one device 3 to be supplied can be present.

Figure 5:
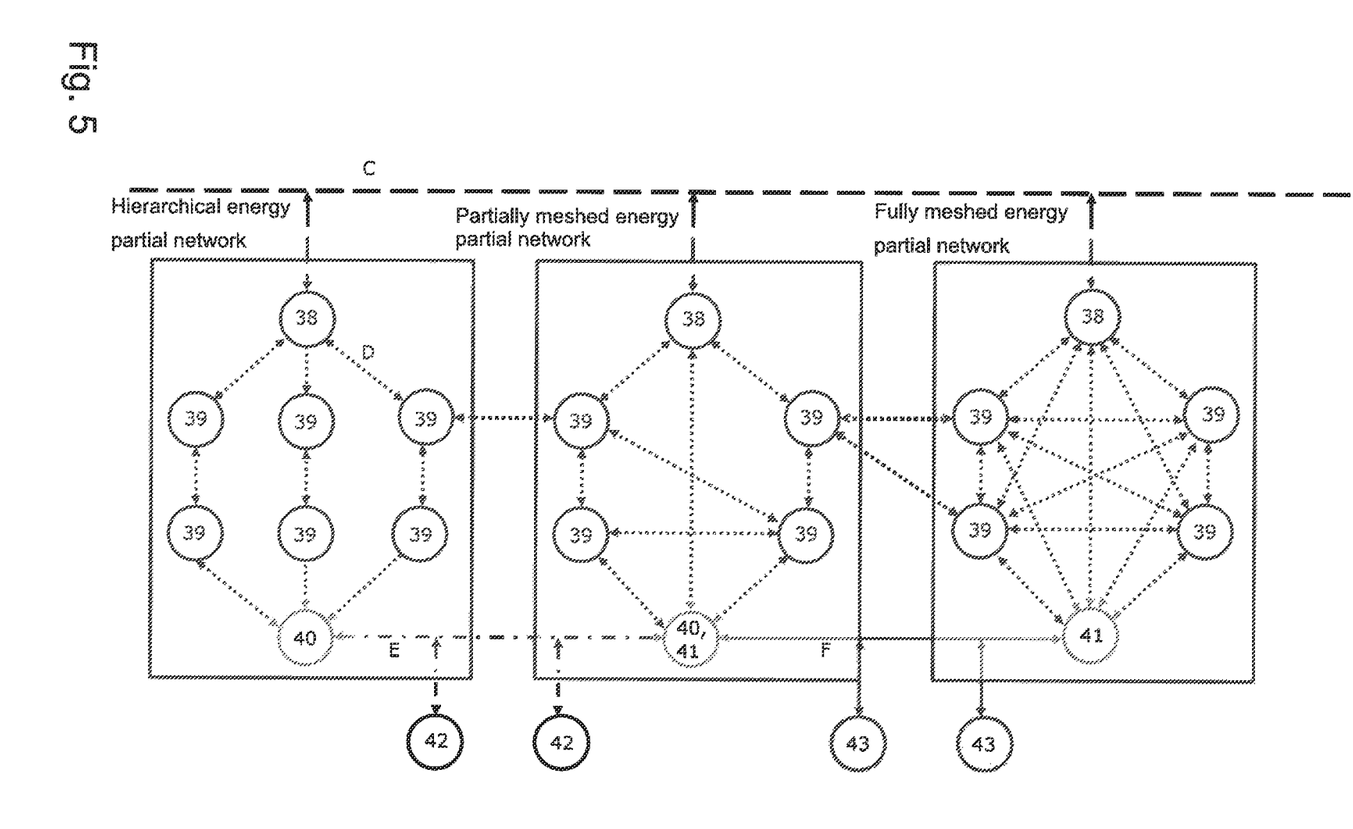
FIG. 5 shows a schematic layout of an energy transmission of a wireless energy network.

FIG. 5 shows a schematic layout of an energy transmission of a wireless energy network by way of example. In this case a hierarchical energy partial network, a partially meshed energy partial network and a fully meshed energy partial network are illustrated.

In this case the hierarchical energy partial network consists of an energy network subscriber 38, of which the energy transmission is generated with wireless focused and directional energy radiation. Furthermore, in this partial network several energy network subscribers 39 are present, which have energy transmission by wireless focused and directional energy radiation. Furthermore, this partial network has an energy network subscriber 40, which has energy transmission with wireless focused and directional energy radiation and a gateway function to subscribers with wireless e.g. inductive energy transmission. Here, for example, as illustrated, the individual subscribers 38, 39 and 40 can transmit energy (for example light) and/or communicate unidirectionally or bidirectionally by means of wireless energy transmission by means of focused and directional energy radiation. This possibility of energy transmission and/or communication is illustrated by the dotted arrow D. Furthermore, the energy network subscriber 40 can transmit energy and/or communicate via a wireless energy transmission by means of non-focused undirected energy radiation (for example inductive energy transmission) with a further energy network subscriber 40 of an adjacent partially meshed energy partial network. This is illustrated by the dash-dot arrow E. For each connected partial network (in this case hierarchical and partially meshed) an energy network subscriber 42 which has a wireless, for example inductive, energy transmission is also introduced into this communication.

The illustrated partially meshed energy partial network, like the hierarchical energy partial network, has the energy network subscribers 38, 39 and 40, wherein the energy network subscriber 40 is additionally configured as energy network subscriber 41 with a wireless focused and directional energy radiation for energy transmission and a gateway function to subscribers with wired energy transmission. In this case this network subscriber 41 can transmit energy and/or communicate with a further network subscriber 41 of a fully meshed energy partial, network via a wired energy transmission F. For each connected partial network an energy network subscriber 43 with wired energy transmission is introduced into this energy transmission and/or communication. Here again, the energy transmission and/or communication among the individual energy network subscribers 38, 39, 40/41 can be configured as illustrated for example. A difference from the hierarchical energy partial network can be recognised here, since the individual energy transmissions and/or communications no longer occur in a "linear" manner but for example also "crossed over" and thus various energy network subscribers can transmit energy and/or communicate with one another.

The fully meshed energy partial network has, with the exception of the energy network subscriber 40, the same energy network subscribers (38, 39, 41) as the partially meshed energy partial network. In this case the difference from the partially meshed energy partial network is that all the energy network subscribers can transmit energy and/or communicate with one another.

All three partial networks (hierarchical, partially meshed and fully meshed) have, as already shown previously, the energy network subscriber 38 by means of which an energy exchange can be carried out with a higher-level energy supply C which in this case is designed as a wired line network or as a wireless energy transmission system.

In this case the individual energy network subscribers 38, 39, 40, 41, 42 and 43 can be formed with or without energy stores.

For reasons of clarity, in the drawings in some instances the references have been placed directly in or on the feature.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES

1 energy supply system
2 energy supply apparatus
3 device/device to be supplied
4 energy relaying line
5 energy converter
6 energy radiation
7 communicative connection
8 web gateway 9 internet
10 central unit
11 local data/control and regulating unit
12 central or internet-based or cloud-based data/control and regulating unit
20 energy converter
21 control unit
22 communication unit
23 energy store
24 position detector unit
25 radiation energy generating unit/energy beam transmitting unit
26 orienting unit of the energy radiation
27 measuring unit for energy radiation
31 position detector unit
32 control unit
33 communication unit
34 energy store
35 energy beam receiving unit/radiation energy converter
36 energy beam collecting unit
37 measuring unit for energy radiation
38 energy network subscriber
39 energy network subscriber
40 energy network subscriber
41 energy network subscriber
42 energy network subscriber
43 energy network subscriber
A data communication with higher-level data/control and regulating unit for the energy transmission
B data communication between energy supply unit and device to be supplied
C exchange of energy with higher-level energy supply
D wireless energy transmission by means of focused and directional energy radiation
E wireless energy transmission by means of non-focused non-directional energy radiation
F wired energy transmission
X1 first variant
X2 second variant
X3 third variant
X4 fourth variant

The invention claimed is:

1. An energy supply apparatus for supplying electrical energy to at least one device spaced apart from this energy supply, wherein the energy supply apparatus can be connected to an energy network and/or is supplied wirelessly with energy by another energy supply apparatus, comprising at least one position detector unit for detecting a geometric or spatial position of the at least one device and an orienting device for orientation of an energy beam of the energy supply apparatus, wherein the energy supply apparatus and/or the energy radiation carp be oriented with respect to the at least one device in such a way that energy can be transmitted by the energy supply apparatus wirelessly to the device and/or the device can be supplied with electrical energy by the energy supply apparatus, and wherein an energy transmitting unit is configured to adapt an energy beam, with regard to a characteristic, to the requirements of an energy receiver and/or the specifications of a local and/or decentralised and/or central and/or internet-based or cloud-based control or regulation, wherein this characteristic is selected from a group of characteristics Which comprises the energy density, the beam geometry, the type of radiation or other parameters relevant for the energy transmission.

2. The energy supply apparatus according to claim 1, wherein the energy supply apparatus and/or the device is arranged in a mobile or stationary manner.

3. The energy supply apparatus according to claim 1, Wherein the position detector unit is selected from a group of position detector units which comprises one or more cameras, beacon technologies, a GPS sensor, GSM location, WLAN location, Bluetooth location, a compass, gyrometer, altimeter, a position sensor, an inclination sensor and/or an acceleration sensor, a position scan units and/or combinations of these devices.

4. The energy supply apparatus according to claim 1, wherein the position of the spaced-apart device and/or of several devices can be detected autonomously.

5. The energy supply apparatus according to claim 1, wherein the energy can be transmitted by directional energy radiation and/or energy bundle.

6. The energy supply apparatus according to claim 5, wherein the energy radiation is selected from a group of energy sources which comprises light in the visible wavelength range, light in the non-visible wavelength range, lasers, microwaves, radio radiation, X-ray radiation, radar radiation, inductive radiation, ultrasound, capacitive radiation or masers.

7. The energy supply apparatus according to claim 1, wherein the at least one device to be supplied and/or the energy supply apparatus has and/or can produce a communicative connection to the energy supply apparatus and/or a local data unit or control unit and/or a central or Internet-based data unit or control unit.

8. The energy supply apparatus according to claim 7, wherein the communicative connection data can be transmitted to the energy supply apparatus, these data being characteristic for an energy supply to the device and/or an energy transmission, such as in particular but not exclusively a position of the device, a degree of effectiveness, a maximum power, a required amount of energy, an energy consumption or a state of charge of the device.

9. The energy supply apparatus according to claim 1, wherein the energy supply apparatus is assigned with a measuring unit for measuring a transmitted energy and/or an incoming energy at a device to be supplied and/or an energy consumption.

10. The energy supply apparatus according to claim 1, wherein an energy transmission unit is configured to orient the energy beam by time-division multiplexing dynamically alternating on several devices to be supplied or energy receiving units simultaneously or quasi-simultaneously and/or the energy transmission unit s configured to split up the generated energy beam to several energy beams and orienting the respective split-up energy beams relative to a device to be supplied and/or to several devices to be supplied and/or the energy transmission unit has several individual energy transmission units or radiation units which emit the same and/or different types of radiation and/or the same and/or different orientations of the radiation, and as a result energy can be transmitted simultaneously and/or quasi-simultaneously to several devices to be supplied or energy receiving units, wherein, with the respective energy beam, energy and/or simultaneously information for identification of an energy transmission apparatus or the energy transmission unit and/or simultaneously information for data exchange with the device to be supplied or the device application can be transmitted.

11. A device to be supplied with energy to which energy can be transmitted wirelessly by an energy supply apparatus according to claim 1, wherein the device to be supplied has one or more energy receiving units and/or is capable of collecting the energy radiation at the surface or close to the surface and guiding it to the receiving unit and/or to several receiving units, wherein the device to be supplied with energy is supplied by at least one energy supply apparatus with energy in each case of the same type of radiation and/or in each case different types of radiation and/or by information in the energy beam it is possible to ascertain which energy transmitting unit has transmitted the energy and thus several energy supply apparatus can transmit energy to a device and the respective amount of energy transmitted can be detected by measurement techniques and assigned and/or information in the energy beam can be evaluated and on the basis of the information in the energy beam a data exchange with the device or the device application is made possible.

12. The energy supply apparatus according to claim 10, wherein an energy transmitting unit is configured to adapt an energy beam, with regard to a characteristic, to the requirements of an energy receiver and/or the specifications of a local and/or decentralised and/or central and/or internet-based or cloud-based control or regulation, wherein this characteristic is selected from a group of characteristics which comprises the energy density, the beam geometry, the type of radiation or other parameters relevant for the energy transmission.

\* \* \* \* \*